W. A. RYAN.
MOVING PICTURE APPARATUS.
APPLICATION FILED AUG. 30, 1910.

1,153,341.

Patented Sept. 14, 1915.
7 SHEETS—SHEET 2.

Witnesses:
John Enders
Henry A. Parks

Inventor:
William A. Ryan,
by Sheridan, Wilkinson, Scott & Richmond,
Attys.

W. A. RYAN.
MOVING PICTURE APPARATUS.
APPLICATION FILED AUG. 30, 1910.

1,153,341.

Patented Sept. 14, 1915.
7 SHEETS—SHEET 4.

Witnesses:
John Enders
Henry A. Parks

Inventor:
William A. Ryan,
by Sheridan, Wilkinson, Scott & Richmond,
Attys.

W. A. RYAN.
MOVING PICTURE APPARATUS.
APPLICATION FILED AUG. 30, 1910.

1,153,341.

Patented Sept. 14, 1915.
7 SHEETS—SHEET 6.

Witnesses:
John Enders
Henry A. Parks

Inventor:
William A. Ryan,
by Sheridan, Wilkinson, Scott & Richmond,
Attys.

W. A. RYAN.
MOVING PICTURE APPARATUS.
APPLICATION FILED AUG. 30, 1910.

1,153,341.

Patented Sept. 14, 1915.
7 SHEETS—SHEET 7.

Witnesses:
John Enders
Henry A Parks

Inventor:
William A. Ryan,
by Sheridan, Wilkinson, Scott & Richmond,
Attys.

UNITED STATES PATENT OFFICE.

WILLIAM A. RYAN, OF CHICAGO, ILLINOIS.

MOVING-PICTURE APPARATUS.

1,153,341.  Specification of Letters Patent.  Patented Sept. 14, 1915.

Application filed August 30, 1910. Serial No. 579,691.

*To all whom it may concern:*

Be it known that I, WILLIAM A. RYAN, a citizen of the United States, residing at Chicago, in the county of Cook and State of Illinois, have invented certain new and useful Improvements in Moving-Picture Apparatus, of which the following is a specification.

The principal object of my invention is to provide new and improved apparatus of a simple character for the purpose of taking moving pictures.

Another object of my invention is to provide apparatus that may be used by amateurs for taking moving pictures without complicated or elaborate incidents or features.

In certain aspects, my invention is available for exhibiting moving pictures, as will be pointed out in the following specification.

Still another object of my invention is to provide apparatus for moving a picture film intermittently and exposing it through a lens during the intervals of rest.

These objects and various others will be readily appreciated from the following specification and claims, taken in connection with the accompanying drawings, in which I have illustrated one specific embodiment of my invention, together with a limited number of modifications of certain details thereof. These drawings are by way of example, for the purpose of explaining the principle of my invention; the invention itself is defined in the appended claims.

The box or casing 25 has a lens 26 at one side covered by a removable cap 27. Within the casing 25 is a platform or false bottom 28 through which passes the vertical stub shaft 29. The upper end of this shaft 29 carries a disk 30. Another stub shaft 32 in alinement with the shaft 29 is journaled within the upper part of the casing 25 and carries a disk 31 opposite the aforementioned disk 30. These two disks 30 and 31 constitute the heads of a cylindrical drum whose convex wall is designated 33. Outside of this wall 33 is a sleeve 34 rotatable upon the drum 33. The drum 33 and the sleeve 34 each have four substantially rectangular openings 35 spaced equally around their periphery. It will at once be obvious that the effective width of the aperture 35 can be varied by rotating the outer sleeve 34 upon the drum 33.

A crank handle 36 and fly-wheel 37 are carried by a short shaft 38 that projects through the top wall of the casing 25. Within the casing this shaft 38 carries a gear wheel 39 that meshes with a gear wheel 40 on the shaft 32. Thus by means of the handle 36 and the gears just described the drum 33—34 may be rotated. Another crank handle 41 and fly-wheel 42 are mounted on a shaft 43 that extends through the side wall of the casing 25 and carries a bevel gear 44 within the casing that meshes with a bevel gear 45 on the shaft 38. Thus it will be seen that either handle 36 or 41 may be used to rotate the drum 33—34. Of course, it will be evident that only one crank handle and fly-wheel need be employed, and this can be applied to either shaft 38 or 43, as desired.

The drum that drives the film is designated 46, and this has two circumferential series of studs 47 adapted to engage the holes 47' on the edges of the film 48. Another rotatable drum 49 is an idler around which the film 48 passes in its course from one roll to the other.

The mechanism for giving the roll 46 an intermittent drive will now be described.

Figures 9, 10:
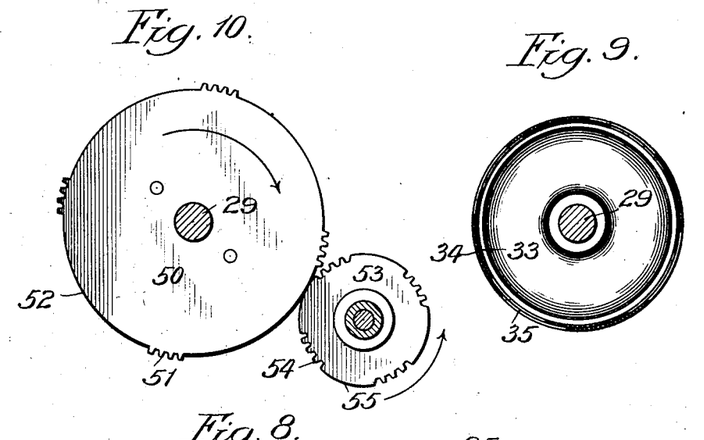
Fig. 9 is a horizontal section of the shutter cylinder.
Fig. 10 is a horizontal section, showing the segmental gears for driving the film.

The drum shaft 29 carries a wheel 50 with spaced groups of gear teeth 51, the intermediate portions 52 of the periphery of the wheel 50 having a plain cylindrical contour. The lower end of the drum 46 carries a wheel 53 with spaced groups of gear teeth 54, the intermediate spaces 55 of the wheel 53 having a smooth cylindrical contour. The teeth 51 project beyond the contour 52 while the points of the teeth 54 are in the same circumference with the contour 55; thus the two contours 52 and 55 touch or nearly touch each other, as shown in Fig. 10.

Figure 8:
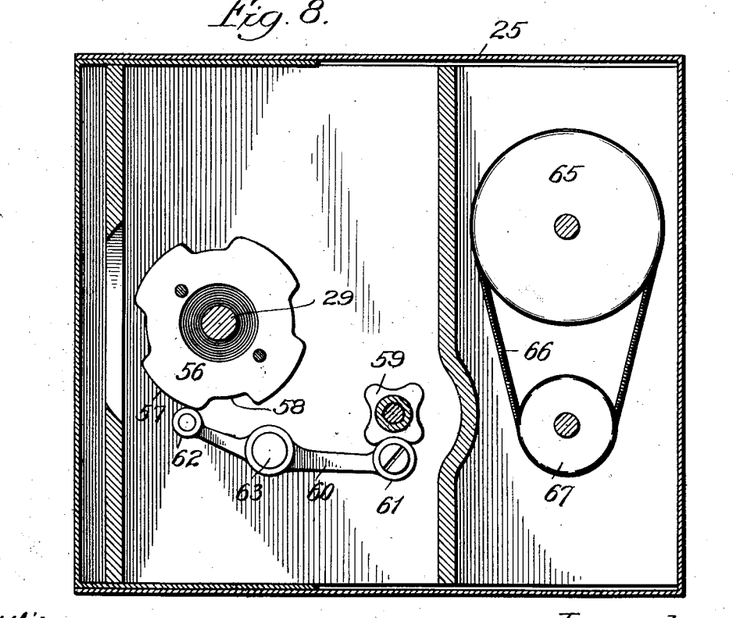
Fig. 8 is a horizontal section on the line 8—8 of Fig. 1.

In addition to the segmental gear wheel, the drum shaft 29 carries a cam wheel 56 with alternating projections 57 and depressions 58, as shown in Fig. 8. The film driving drum 46 also carries a cam or star wheel 59. The lever 60 has rollers 61 and 62 at its ends, and is mounted on a fixed pivot 63 at an intermediate point. The rollers 61 and 62 engage the respective cam wheels 59 and 56, and the relation of the parts is such, as shown in Fig. 8, that when one roller is in a depressed part of its cam wheel, then the other roller must be riding on a projecting part of its cam wheel, and vice versa. The operation of this mechanism will be more fully described a little later.

The drum or spool from which the film is unwound is designated 64. It is detachably mounted on a shaft which carries the grooved band wheel 65. Around this passes the elastic band 66 which engages the grooved band wheel 67, on the shaft that carries the winding drum or spool 68. The band 66 is a fine helical spring which is extensible for a purpose which will be explained later. The film from the drum 64 passes around the idler roller 49 and thence in front of the wall or abutment 69. In front of this is a diaphragm with a rectangular aperture 71. The post 72 carries a curved pivoted leaf 73 which, by means of the spring 74, presses gently but firmly against the film 48 close to the winding drum 68.

The casing 25 has a boss 25' through which slides the sleeve 75. This sleeve 75 has its axis in alinement with the axis of the winding drum 68. On its inner end are two studs 76 adapted, when the sleeve is pushed in as far as it will go, to engage the recesses 77 in the end of the winding drum 68. The object of this is so that the end of the film 48 can be completely wound up on the drum 68 by hand after the end of the film has left the drum 64.

Figure 1:
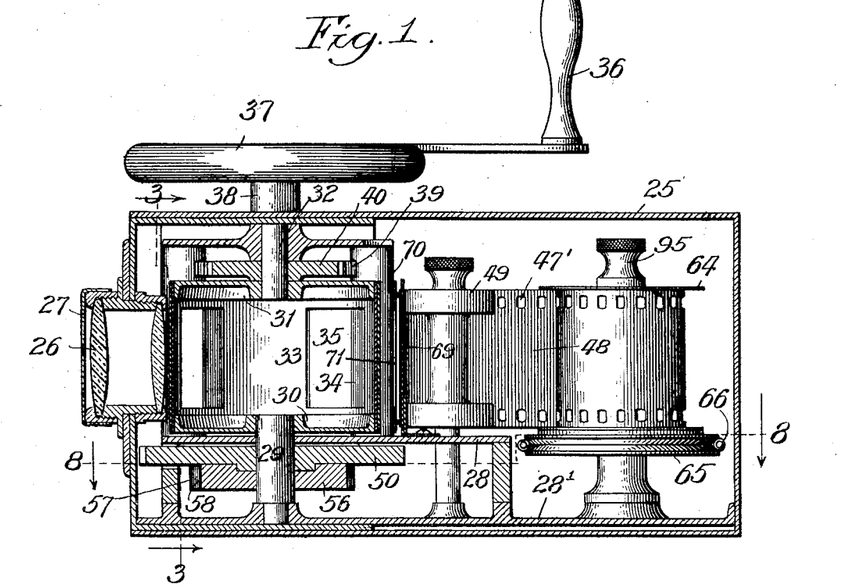
Figure 1 is a central section of the apparatus, taken on the line 1—1 of Fig. 5.
Figure 2:
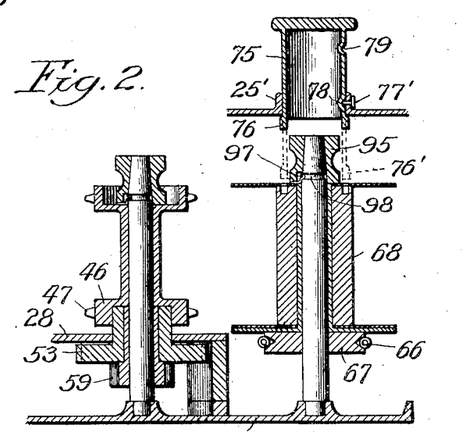
Fig. 2 is a sectional view of a detail on the line 2—2 of Fig. 5.
Figure 4:
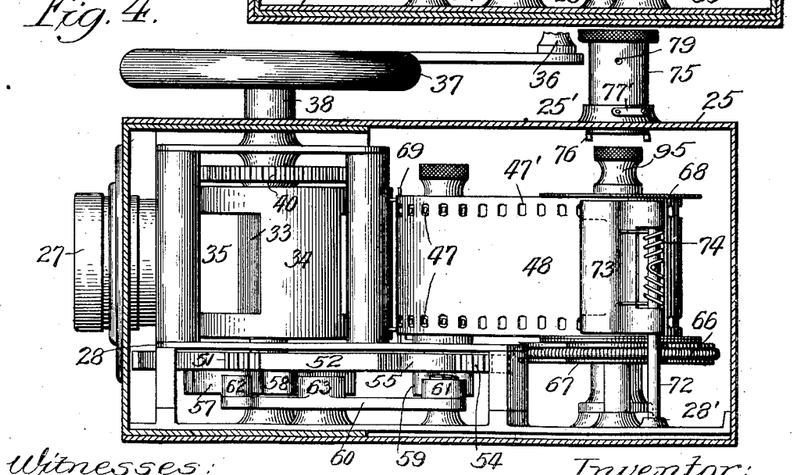
Fig. 4 is a section taken on the line 4—4 of Fig. 5—in other words, this is an elevation of the apparatus, one side cover plate being removed.
Figure 5:
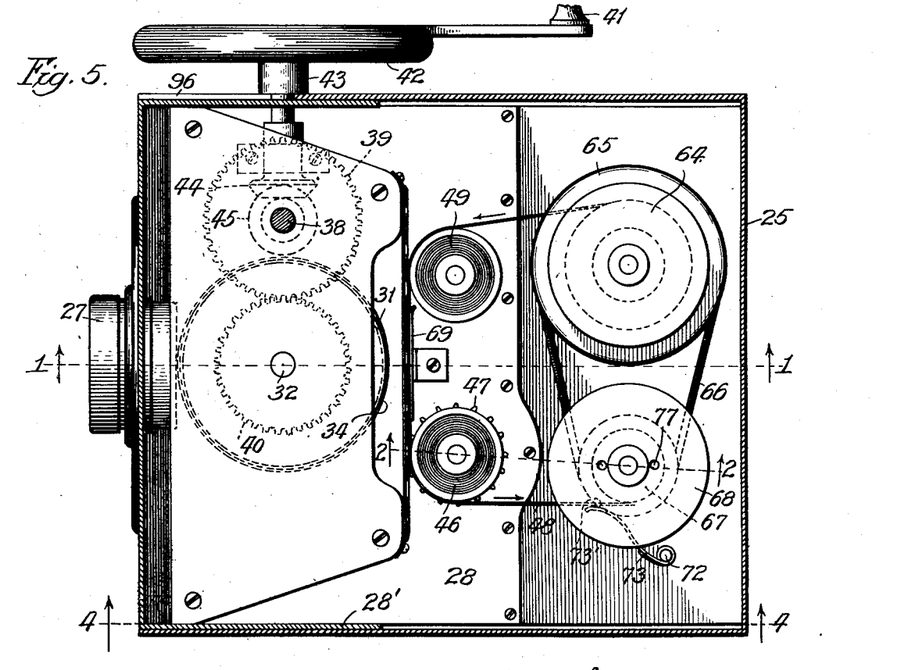
Fig. 5 is a top plan view, the top cover plate being removed.
Figures 6, 7:
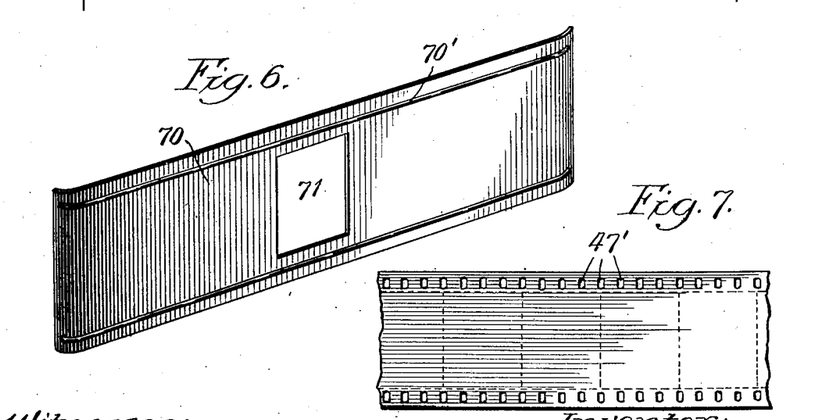
Fig. 6 is a perspective view of a guide diaphragm.
Fig. 7 is a detail view of a section of the film.

The casing 25 is adapted to slide to the right, as viewed in Fig. 1, and thus be removed from the frame 28'. A slot 96 permits such movement with respect to the shaft 43 and a similar slot (not shown) is provided for the shaft 38. When the casing 25 is so applied or withdrawn the sleeve 75 should be in extended position, as shown in Figs. 2 and 4, so that the studs 76 will clear the milled head 95. In this position the spring catch 77' will engage the depression 78. When in operation, the sleeve 75 should be pushed in until the studs 76 take the dotted position 76' then the crank handle 36 will clear the sleeve 75 and the sleeve 75 will be locked by the spring catch 77' engaging the depression 79. The milled heads 95 each carry a spring catch 97 that engages a circumferential groove 98 on the respective drum shaft, and thus retains the drum in place. These heads 95 can be pulled off when the drums are to be removed.

It will be readily understood how the sliding cover can be removed to apply a film roll on the drum 64 and how the film passes about the idler 49 between the abutment 69 and the diaphragm 70 around the toothed driving drum 46 to the winding drum 68. As the film unwinds from the drum 64, the band 66 drives the winding drum 68 so as to take up the slack in the film and the proportion of the pulleys 65 and 67 is such that there is always a tendency to drive the drum 68 faster than the film 48 feeds to it. The band 68, being elastic and extensible, provides for the necessary slippage.

Figures 11, 12, 13, 14:
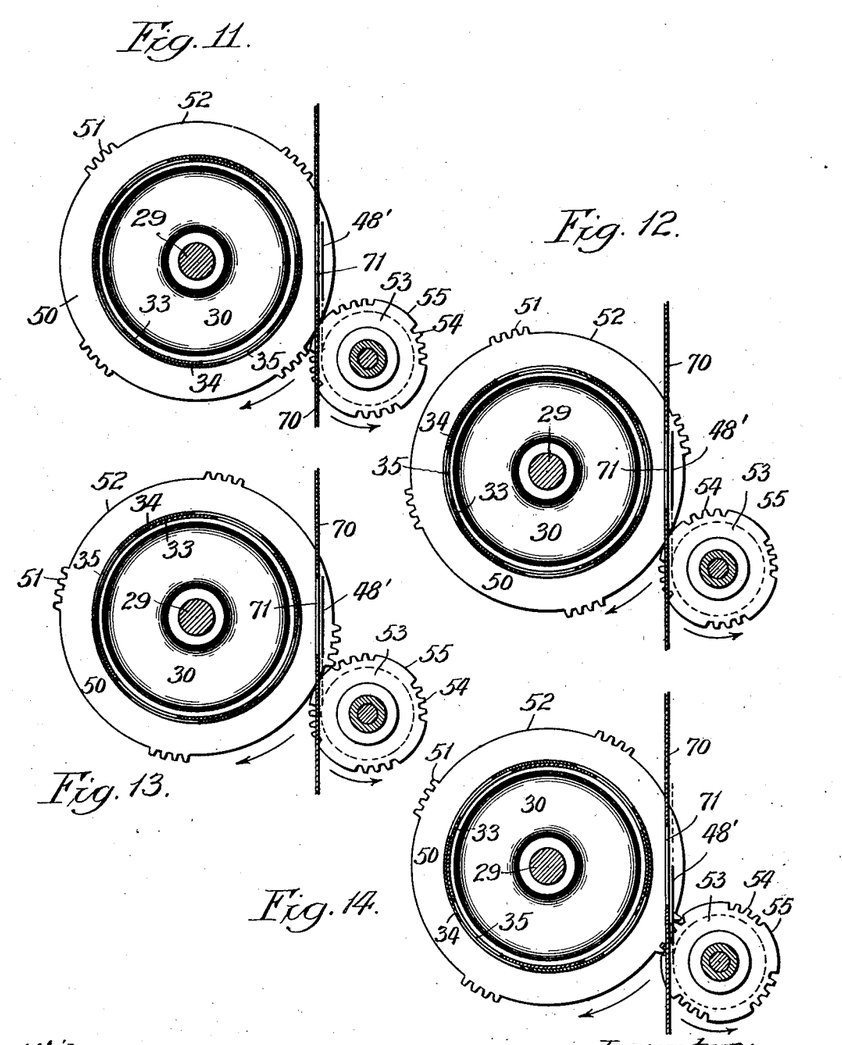
Figs. 11, 12, 13 and 14 are views of the segmental gears and the film in various relations to show how the device operates.

The apertured drum 33—34 is rotated continuously and its windows 35 are opposite one another in pairs, so that as they rotate they successively open and close a path for light from the lens 26 to the opening 71 in the diaphragm 70. The segmental gears 50 and 53 drive the film 48 intermittently. In Fig. 11 the gear teeth 51 of the driving wheel 50 are just leaving the gear teeth 54 of the driven wheel 53, when the film 48 is commencing a period of rest, and a window 35 in the drum 33—34 is just commencing to open so as to expose the film 48 through the opening 71 in the diaphragm 70. For convenience of comparison, the portion of the film 48 thus exposed is designated 48'. In Fig. 12 the film has not changed its position and the window 35 in the drum 33—34 is in the position for fullest exposure. In Fig. 13 the film is still in the same position, but the window 35 has passed so that the path for the light has almost closed. At the same time a group of gear teeth 51 on the wheel 50 are just engaging a group of teeth 55 on the driven wheel 53. A little later, as in Fig. 14, the light still remaining cut off, the intermeshing gear teeth have caused the film to move so that the recently exposed portion thereof 48' has moved half way across the opening 71—a little later, and all the moving parts will again have the relation shown in Fig. 11.

In order that the film 48 may move with absolute definiteness, its edge perforations 47' are engaged by the teeth 47 and the apparatus shown in Fig. 8 is provided. In the position shown in Fig. 8 the lever 60 is held by the part 57 of the rotating cam 56, so that its opposite end roller 61 locks the cam 59 against rotation. At the time when the teeth 51 begin to engage the teeth 54, as in Fig. 13, the cam 56 has rotated so that the roller 62 can just drop into the depression 58 and permit one point of the cam 59 to pass under the roller 61. Then when the teeth 51 leave the teeth 54, as in Fig. 11, the cam 56 has turned so that the projecting part 57 thereof again pushes the roller 62 out and the roller 61 in, thus holding the cam 59 against rotation and holding the film 48 stationary, as in Figs. 12 and 13.

Figure 15:
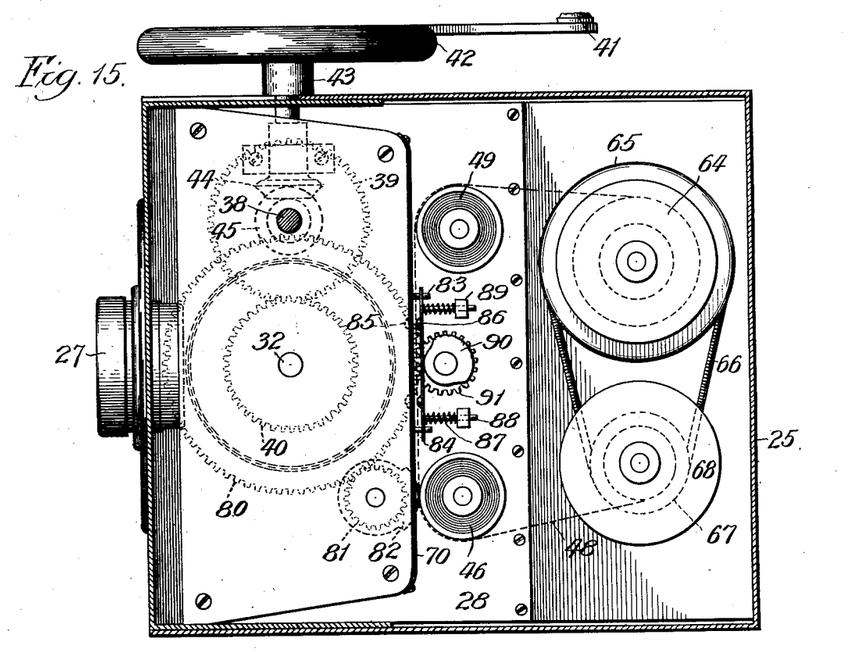
Fig. 15 is a top plan view, the top cover plate being removed, of a modified form of intermittent film driving mechanism.
Figure 16:
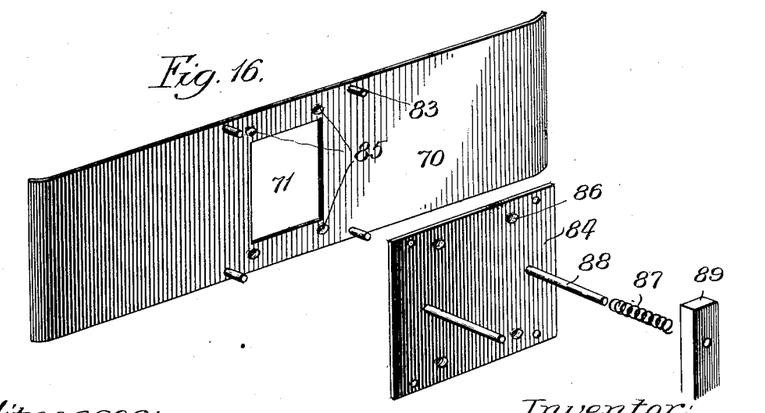
Fig. 16 is a perspective view of certain elements of this same modification.
Figures 18, 19:
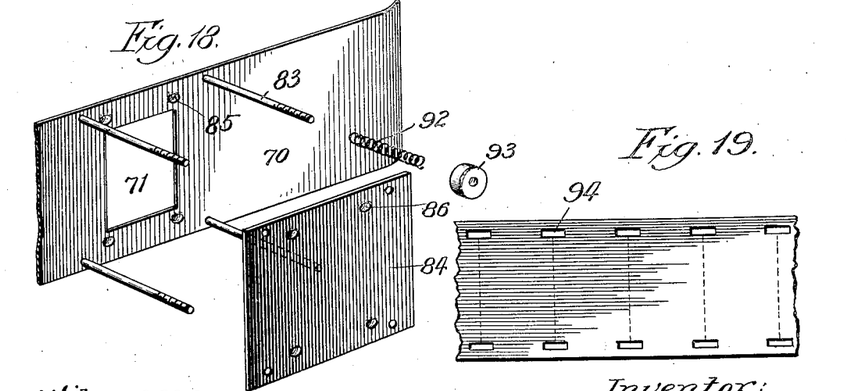
Fig. 18 is a perspective view of certain elements of the modification shown in Fig. 17.
Fig. 19 is a detail view of a portion of the film used in connection with the modifications of Figs. 15 and 17.

The modification shown in Figs. 15 and 16 dispenses with the teeth 47 on the driving drum 46. In Fig. 15, the drum 46 is an idler and the segmental drum 82 is provided driven by a continuous gear 81 meshing with a similar gear four times as large on the shaft 32 with the drum 33—34. The segment 82 presses the film between it and the drum 46 and drives the film 48 intermittently. The plate 84 is made horizontally movable on the studs 83 that project from the diaphragm 70. The diaphragm carries a set of depressions 85 and the plate 84 carries a set of registering projections 86. The film has a series of perforations 94, as shown in Fig. 19, which register successively with the depressions 85 and projections 86. The plate 84 has pins 88 projecting therefrom through the fixed posts 89 and the tension springs 87 surround these pins 88 and have their ends fastened, respectively, to the plate 84 and the posts 89. These springs 87 tend to pull the plate 84 away from the film 48. The cam 90 driven by a gear 91 meshing with the gear 80 is so positioned as to push the plate 84 against the diaphragm 70 and thus lock the projections 86 into the perforations 94 when the segmental roller 82 is not in engagement with the film 48 to drive it. Reciprocally, when the segmental roller 82 is in engagement with the film 48, the cam 90 is in a position to release the film at 85—86.

Figure 17:
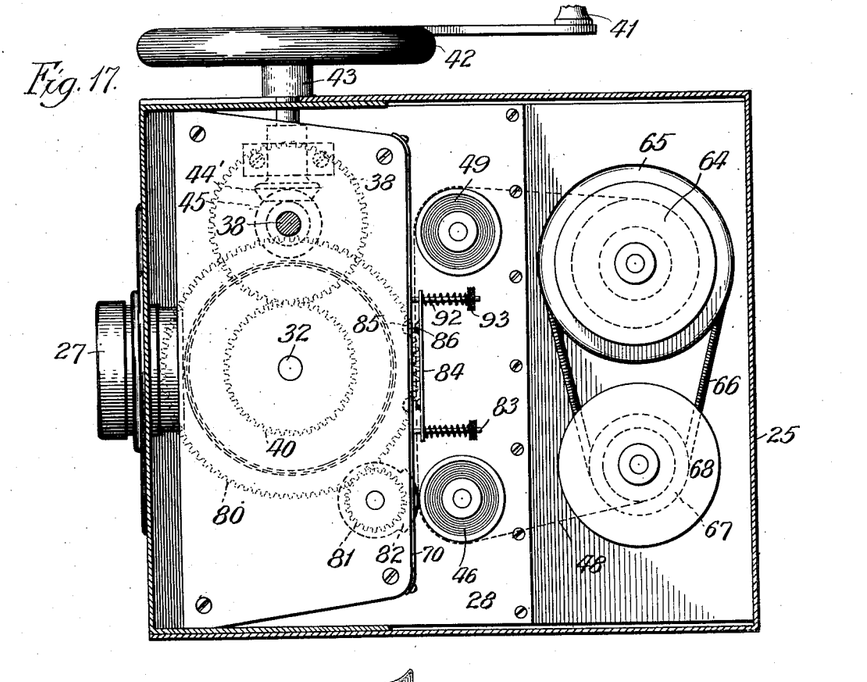
Fig. 17 is a top plan view, showing a still further modification.

The modification shown in Figs. 17 and 18 uses the same segmental roller 82 for driving, as explained for Fig. 15, but the cam 90 is dispensed with. In the case of Fig. 17, each stud 83 is prolonged and carries a compression spring 92 which acts against the milled head 93 as an abutment. In this case the springs normally press the projections 86 into the sockets 85, but the projections 86 are gently beveled so that when the film is driven it can have the perforations 94 readily pulled out. Without the elements 85—86 the film might possibly go a trifle irregularly, but with these elements it is always brought into a definite position, as will be readily apparent.

It will be seen that I have invented a moving picture camera which alternately holds the film stationary and exposes it and then darkens the film and moves it, all by comparatively simple mechanism. The mechanism is rugged and durable and can easily be manipulated by amateurs. The intermittent driving mechanism can obviously be applied to a picture exhibiting apparatus.

Figure 3:
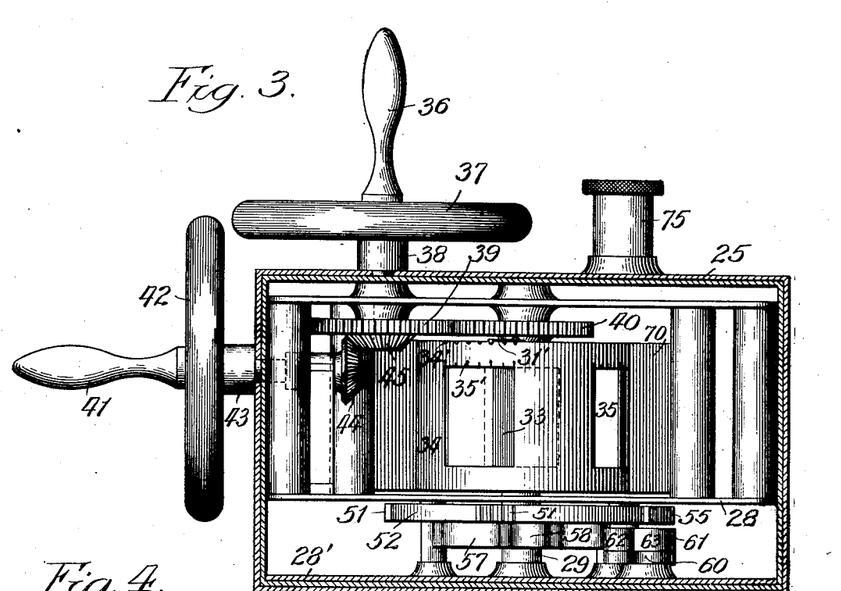
Fig. 3 is a vertical transverse section, taken on the line 3—3 of Fig. 1.

Referring to Fig. 3, it will be seen that a series of notches 34' are cut in the sleeve 34 and a spring catch 31' is mounted on the disk 31 to engage one of said notches. A scale 35' is marked on the edge of the opening in the drum 34. It will at once be seen that by means of the elements just described the aperture 35 can be set at any desired adjustment and retained there.

The longitudinal ribs 70' on the diaphragm 70 hold the sensitized surface of the film out of contact with said diaphragm and protect it from injury thereby.

The pivoted leaf 73 has buttons 73' at its corners which engage the edges of the film 48; thus the intermediate sensitized surface of the film 48 is protected from injury by abrasion.

I claim:

1. In a device of the class described, a rectangular casing, a film-carrying roll within the casing at one side thereof, a partial partition across the casing beside said roll, a false bottom within the casing at the other side of the partition from said roll, said false bottom and partial partition completely inclosing the space within the same, a rotary cylindrical shutter mounted on a shaft projecting through said false bottom, a film-driving roll mounted on a similar shaft, and intermittent driving connections between the two shafts beneath the false bottom.

2. In a device of the class described, a film, intermittent driving means therefor, a fixed plate beside which the film passes, a plurality of bars projecting from said fixed plate beside the film, a movable plate with holes therein mounted on said bars with the bars engaging the said holes, rounded projections on the said movable plate, said film having perforations to be engaged by these projections, and means to actuate said plate to cause said projections to engage said film perforations.

3. In a device of the class described, a perforated film, intermittent driving means therefor, two parallel plates between which the film passes, one fixed and the other displaceable, guides constraining the movement of the second plate in a direction at a right angle to the film, projections from said second plate adapted to engage the perforations in the film, and means to actuate said last-mentioned plate to cause said projections to engage said film perforations.

4. In a device of the class described, a perforated film, intermittent driving means therefor, two parallel plates between which the film passes, one fixed and the other displaceable, guides constraining the movement of the second plate in a direction at a right angle to the film, projections from said second plate adapted to engage the perforations in the film, and a cam adapted to act on said last mentioned plate in alternation with said intermittent driving means for the film.

5. In a device of the class described, a perforated film, intermittent driving means therefor, two parallel plates between which the film passes, one fixed and the other displaceable, guides constraining the movement of the second plate in a direction at a right angle to the film, projections from said second plate adapted to engage the perforations in the film, a cam adapted to act on said last mentioned plate in alternation with said intermittent driving means for the film, and a spring to act on said last mentioned plate in opposition to said cam.

In testimony whereof, I have subscribed my name.

WILLIAM A. RYAN.

Witnesses:
 FRANK EVANS,
 CARL A. RICHMOND.